United States Patent [19]
Caine

[11] Patent Number: 5,889,628
[45] Date of Patent: Mar. 30, 1999

[54] MULTICOLOR ANTIQUATION SCREEN

[76] Inventor: Michael C. Caine, 3400 Treeline Ct. Apt. 1304, Birmingham, Ala. 35216

[21] Appl. No.: 863,838

[22] Filed: May 27, 1997

Related U.S. Application Data

[63] Continuation-in-part of Ser. No. 367,871, Jan. 3, 1995, abandoned.

[51] Int. Cl.⁶ ...................................................... G02B 5/22
[52] U.S. Cl. ............................ 359/891; 355/32; 399/221; 430/7
[58] Field of Search ............................... 359/891; 352/85; 354/295; 355/32, 40, 71; 430/7; 399/221

[56] References Cited

U.S. PATENT DOCUMENTS

| | | | |
|---|---|---|---|
| 3,519,423 | 7/1970 | Sharp | 430/7 |
| 3,672,766 | 6/1972 | Levy | 355/32 |
| 3,925,082 | 12/1975 | Fielding et al. | 430/228 |
| 4,179,209 | 12/1979 | Goren | 355/327 |
| 4,362,806 | 12/1982 | Whitmore | 430/202 |
| 4,463,079 | 7/1984 | Gilmour et al. | 430/7 |

*Primary Examiner*—Cassandra Spyrou
*Assistant Examiner*—Darren E. Schuberg

[57] ABSTRACT

An improved method for producing multicolor photographic images which resemble color photographs made prior to 1936. Light expressing a photographic image is passed through a transparent multicolor screen (20). Visual characteristics of the image are altered so as to produce darkened tonality, loss of acuteness, muting of hue, and a general sepia color cast.

5 Claims, 8 Drawing Sheets

SECTIONAL VIEW

OVERLAY TRANSMISSION AND REFLECTION FILTERS

PLAN VIEW - MULTICOLOR SCREEN

SECTIONAL VIEW - MULTICOLOR SCREEN

SECTIONAL VIEW - REFLECTIVE FILTER

SECTIONAL VIEW - TRANSMISSION FILTER

SECTIONAL VIEW - TRANSMISSION FILTER

SECTIONAL VIEW -
INCREASED DENSITY MULTICOLOR TRANSMISSION FILTER

ELECTRONIC CONVERSION

SECTIONAL VIEW - REFLECTIVE FILTER

SECTIONAL VIEW

SECTIONAL VIEW

OVERLAY TRANSMISSION
AND REFLECTION FILTERS

MULTICOLOR ANTIQUATION SCREEN

This is a continuation in part of application Ser. No. 08/367,871 filed Jan. 03, 1995 now abandoned.

BACKGROUND

1. Field of the Invention

This invention relates to photomechanical processes, specifically to such processes which are used to alter the hue, tonality and definition of a photographic image.

2. Description of Prior Art

A commercial market exists for multicolor photographic images that appear antiquated in appearance. Such antiquated images exhibit characteristics such as increased or darkened tonality, loss of sharpness, loss of hue, and the presence of a general color cast (usually amber or sepia). Thus, the term "antiquated" in this patent refers to any positive color photographic image which exhibits all of the above visual characteristics, or resembles color photographic images made prior to 1936. Furthermore, the term "antiquation" may also refer to the process of achieving an antiquated image.

One of the original methods used to achieve antiquated color is the hand tinting of black and white photographs. This practice is still done today. This method's primary advantage is that it allows the colorist to enhance a given feature in an image by highlighting the desired feature with an attractive color while de-emphasizing the other areas with a more muted color. However, hand-tinting method has notable limitations. As a practical measure, it is limited to negative black-and-white film printed on fiber-based, or non-glossy, or absorbent paper, In addition, the colorist is generally limited to soft pastel hues. More importantly, hand-tinting is time consuming and thus costly. As a consequence, customers are often required to select a black and white image for colorization without knowing how the result will appear.

Sepia toning and sepia filters are sometimes used to achieve antiquated multicolor images. This practice is done either by placing a transparent, sepia-colored filter between the film and the light source or by using toning solution immediately after development. While these methods are both quick and inexpensive, they produce multicolor images that only vaguely resemble antiquated images as previously defined. At best, sepia colorization creates a vivid contemporary color picture with an amber cast.

Antiquated multicolor images may also be created by using multiple gum or other color separation processes. These methods are original but very cumbersome because they require multiple exposures of an image before it can be transformed into a multicolor picture.

Perhaps the most practical method for producing color antiquated photographs was the Autochrome method developed by the Lumière brothers. Their method was successfully marketed from 1907 to 1936. The Autochrome method utilized the concept of the multicolor screen. In general, the color screen consists of a screen pattern that is formed by a plurality of light-filtering elements.

A conventional three-color screen has a set of primary red colored filter elements, a set of primary blue colored filter elements, and a set of primary green colored filter elements. Alternatively, the color screen may also employ yellow, cyan, magenta, or other related color elements. One preferred arrangement is of a mosaic type; that is, a less than strictly geometric arrangement with regard to element size shape, and/or color placement with each element measuring between one to three hundred microns in diameter. Thus the individual screen elements are not easily distinguished by the unaided eye.

Several methods may be used to produce the multicolor screen as described above. Basically, the methods of color screen production fall into three main categories: mechanical methods, photochemical processes, and electronic transfer methods. In the mechanical methods, screen elements are formed largely without chemical reactions. In the photochemical processes, multicolor screens are produced largely as a function of exposure and development. Finally, in the electronic transfer methods, visual characteristics are converted into digital or analog signals which are then translated into a variety of visual media.

With the Lumière method, a dust of red, green, and blue colored starch particles was allowed to settle onto the tacky surface of a sheet of glass. Then the particles were flattened out into tiny screen elements measuring about 0.015 millimeters in diameter. The resulting screen was then covered with a panchromatically sensitized black and white positive emulsion. The exposed and developed plate would yield a reasonably faithful multicolor image upon projection. While a practical method for its time, Autochrome suffered two primary drawbacks. First, the color screen absorbed about seventy-five percent of the light, resulting in the necessity for lengthy exposures. Secondly, the multicolor screen had to remain in register with its emulsion coating, thus requiring a new screen for each image exposed.

Since Autochrome, many films have been developed to employ multicolor screens with their emulsion systems, notably: U.S. Pat. No. 3,519,423 Sharp, Jul. 7, 1970 method of making multicolor screens, U.S. Pat. No. 3,925,082 Fielding et al, Dec. 9, 1975 multicolor screen containing hydrophilic colloid . . . , U.S. Pat. No. 4,362,806 Dec. 7, 1982 Whitmore Imaging with nonplaner support elements: and U.S. Pat. No. 4,463,074 Jul. 31, 1984 Gilmour/Blazey et al, elements containing ordered wall arrays.

The latter patent of Gilmour/Blazey is an improvement of the Whitmore patent. The Gilmour/Blazey patent employs both mechanical and photomechanical methods to create microscopic cavities known as micro cells or reaction micro vessels. These cavities may then be filled with a variety of imaging and or coloring components by using doctor blade coating, solvent casting, or other conventional coating techniques.

Difficulties arise when comparing Gilmour/Blazey, with the present invention. Some of the stated objectives of Whitmore, the predecessor to Gilmour/Blazey, were the following: enhanced contrast, correct reading color, improved definition, enhanced film speed (without graininess), and the reduction of lateral image spreading or halation. Subsequent improvements by Gilmour/Blazey were in accord with these objectives. In contrast, the primary objectives of the present invention are the following: the alteration of the characteristics of an image so as to affect darkened tonality, loss of sharpness or definition, loss or muting of color, and the presence of a general color cast (usually amber or sepia). These characteristics, when taken collectively, cause an image to be perceived as antiquated in appearance as described above.

The former patent, Gilmour/Blazey, has the following limitations:

(a) The color screen produced is physically attached to a light sensitive emulsion, or the screen is otherwise integrated with the image. This attachment forms elements of a photographic emulsion, thereby causing the production of a separate color screen for each exposure formed.

(b) In order to utilize the former patent, the photographer must expend a separate color screen for each image recorded.

(c) Because the multicolor screen is performed in the initial unexposed film, the photographer who uses rolled film may not alternate or otherwise change imaging characteristics during recording without changing film. For example, when using a ten exposure roll, the photographer may not record the first five exposures without the multicolor screen and the last five exposures with it.

(d) Production of the multicolor screens in the Gilmour/Blazey patent involves multiple steps and industrial techniques, therefore requiring substantial equipment, energy, and capital investment.

(e) The size ratio of the individual colored elements to the film image is fixed in production. This ratio limits the enlargement of an image to a given size beyond which the individual areas of the multicolor screen become readily visible to the unaided eye.

SUMMARY

Several objects and advantages of the present invention are:

(a) To provide a means by which multicolor photographic images that are generally described as old fashioned or antiquated in appearance may be produced.

(b) To provide a means by which antiquation may be affected quickly and inexpensively.

(c) To provide a means by which the photographer may affect antiquation on selected exposures of rolled film and omit it on others without changing the film.

(d) To provide a means by which an indefinite number of photographic images may be antiquated by using a single multicolor screen configuration.

(e) To provide a means by which antiquation may be affected without placing the multicolor screen in register with the recording film.

(f) To provide a means by which antiquation may be affected from images recorded on any color film stock, regardless of format, film speed, or negative or reversal category.

(g) To provide a means by which the size relationship between the individual areas of the multicolor screen and the recorded image may be conveniently varied so that an enlargement of any size may be obtained without rendering individual areas clearly visible to the unaided eye.

Further objects and advantages of my multicolor screen will become apparent from a consideration of the drawings and the ensuing descriptions.

BRIEF DESCRIPTION OF THE DRAWINGS

Drawings of related figures have an alphabetic suffix accompanying the numbers.

Reference Numerals in Drawings

Figure 1A:
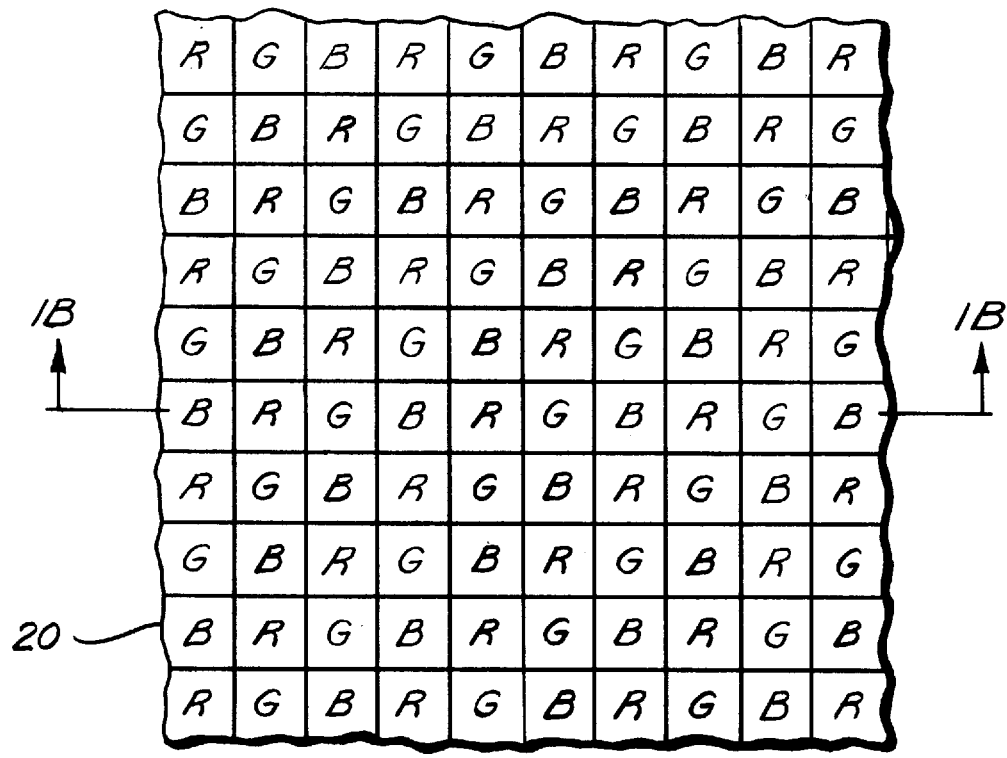
FIG. 1A shows a multicolor screen with separate red, green, and blue elements.

| Reference Numerals in Drawings | |
|---|---|
| 10 | diffusion filter |
| 20 | multicolor screen |
| 25 | unexposed media |
| 30 | transparent base |
| 40 | reflective base |
| 45 | projection device |
| 50 | translucent filter |
| 60 | increased density multicolor screen |
| 65 | photographic image |
| 70 | electronic processor |
| 75 | diffusion effect |
| 80 | sample product |

DESCRIPTION OF THE PREFERRED EMBODIMENTS

Figure 1B:
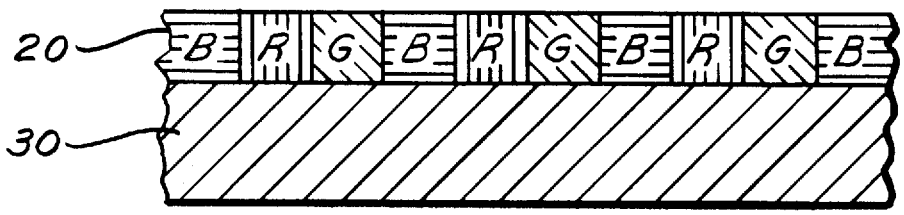
FIG. 1B shows a multicolor screen in sectional view with a transparent base.
Figure 2:
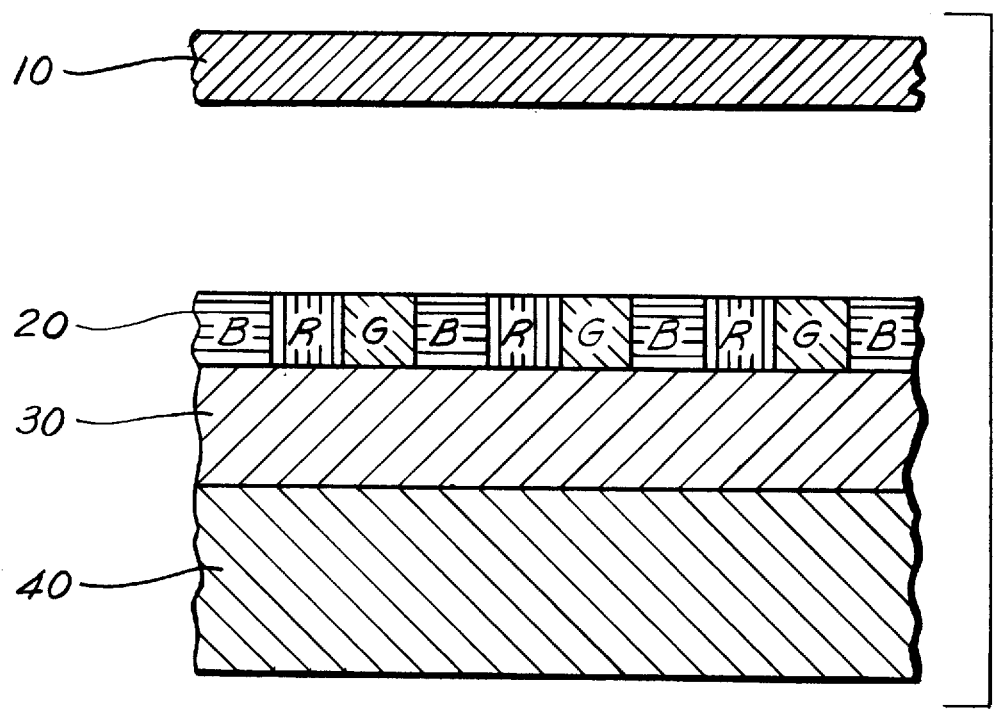
FIG. 2 shows a multicolor screen against a reflective base and a separate diffusion filter.

A transparent multicolor screen 20 containing separate red, green, and blue colored filter elements is illustrated in FIG. 1A. FIG. 1B shows a sectional view with a transparent base 30. The above multicolor screen is purely mechanical in function. It neither contains nor is attached to any unexposed, light-sensitive emulsion. The respective depths and sizes of the colored filter elements and the transparent base have been exaggerated for the sake of illustration. In FIG. 2, the multicolor screen 20 and transparent base 30 are attached to a reflective base 40 which is usually white, although colored and mirrored surfaces are also contemplated. In one preferred embodiment, a projection device 45 expresses a negative or reversal photographic image. The multicolor filter 20 and its reflective base 40 are positioned so that the plane formed by their widths occupies the plane of focus of the above mentioned projected image. Photons from the projected image are filtered according to color as they pass through a multicolor screen 20. Photons then bounce off a reflective base 40 and are filtered again as they return through the multicolor screen 20. The resulting image simultaneously expresses all of the visual characteristics of an antiquated image as previously defined. Furthermore, the image may be viewed or recorded using conventional photographic means. Unlike the prior art, the multicolor screens in this invention are mechanical in function. Consequently, the multicolor screens may be reused an indefinite number of times.

by placing a diffusion filter at right angles to the path of projected radiation. This filter occupies some or all of the area of the projected radiation.

Figure 3:
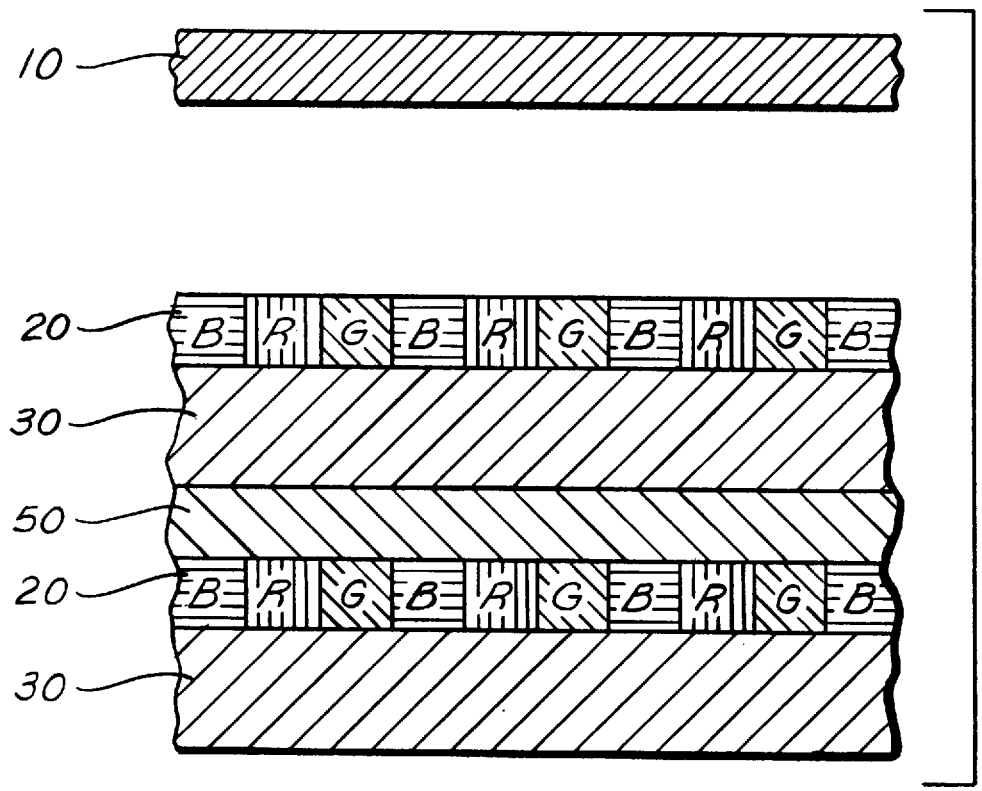
FIG. 3 shows two registered multicolor screens divided by a translucent screen and a separate diffusion filter.

In FIG. 3 the exponential filtration described above is affected by placing two multicolor screens 20 in register, then placing a translucent filter 50 between the multicolor screens 20. In this embodiment, radiation coming from a projection device 45 expressing a photographic image passes through both multicolor screens 20 and produces the degree of filtration needed to significantly alter the visual characteristics of the image. The multicolor screens 20 are positioned so that the translucent filter 50 occupies the plane of focus of the projected image.

Figure 4:
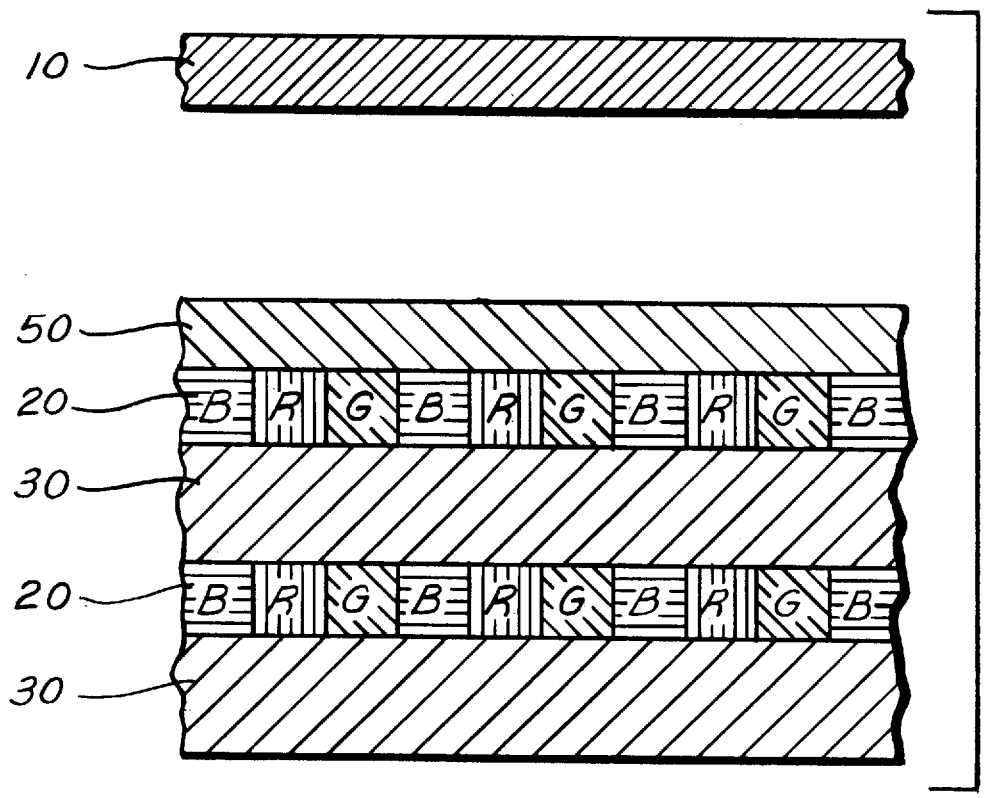
FIG. 4 shows two registered multicolor screens attached to a translucent screen and a separate diffusion filter.
Figure 5:
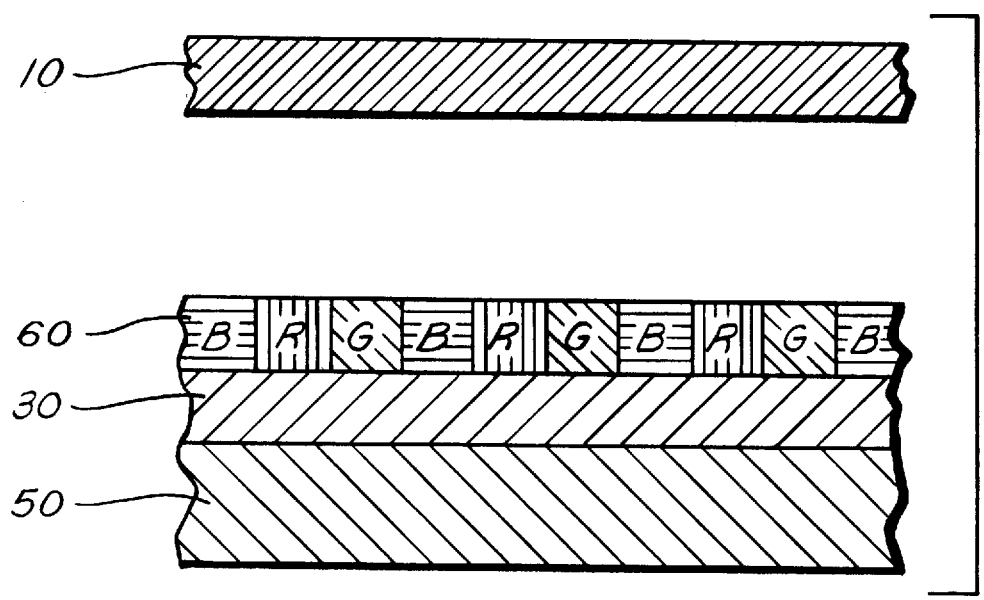
FIG. 5 shows a multicolor screen with increased color density attached to a translucent screen and a separate diffusion filter.

In another preferred embodiment (FIG. 4), the translucent filter 50 is placed either in front of or behind the two registered multicolored screens 20. In yet another preferred embodiment (FIG. 5), the individual colored elements that comprise the multicolor screen 20 are of such density of color that a single increased density multicolor screen 60 is adequate to affect the antiquation of a projected image. A translucent screen 50 is placed in front of or behind the increased density multicolor color screen 60, and the resulting image may be recorded from the opposite side of the filter arrangement as above.

Figure 6:
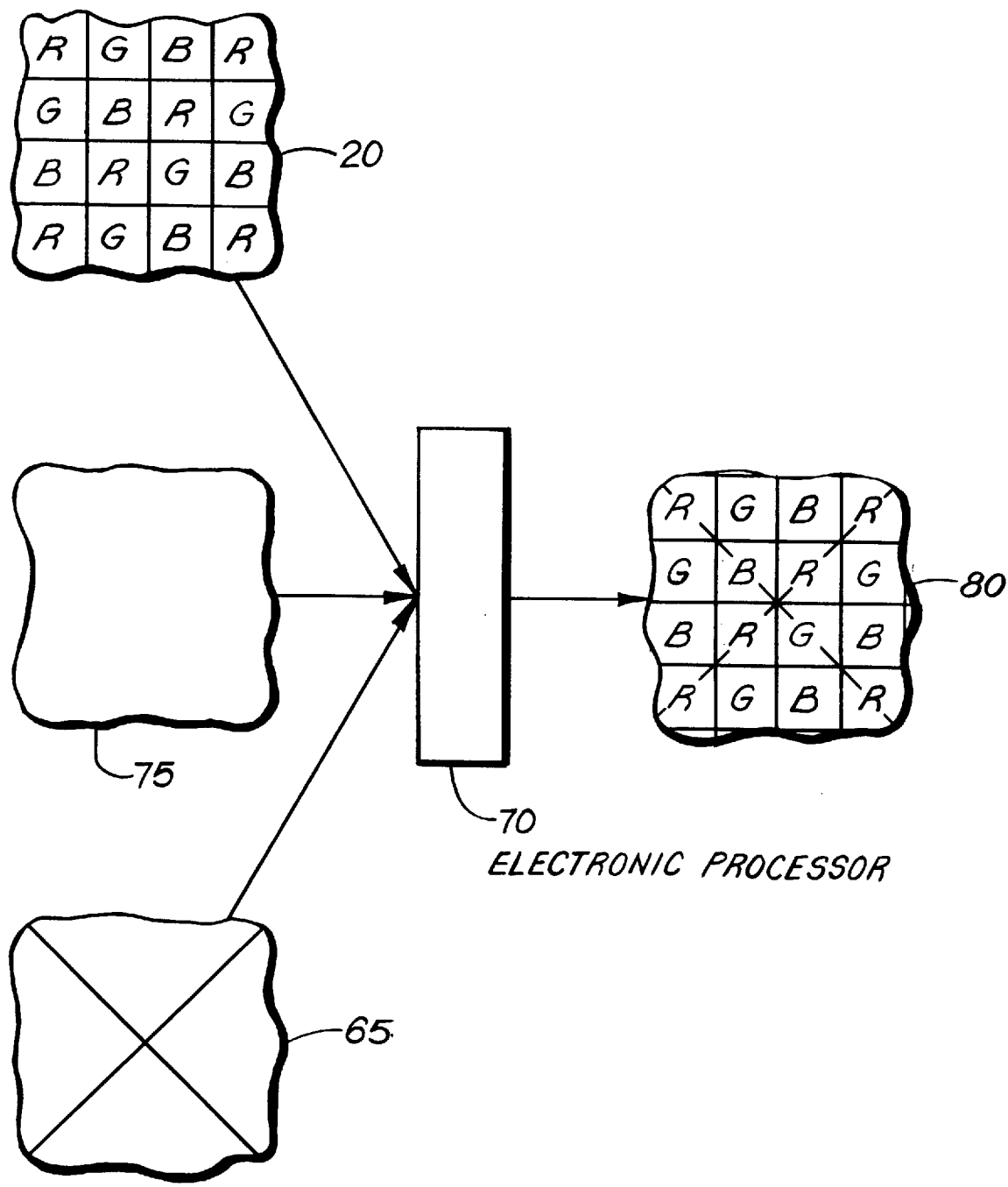
FIG. 6 shows two images, a diffusion effect, an electronic conversion unit, and a sample product.
Figure 7:
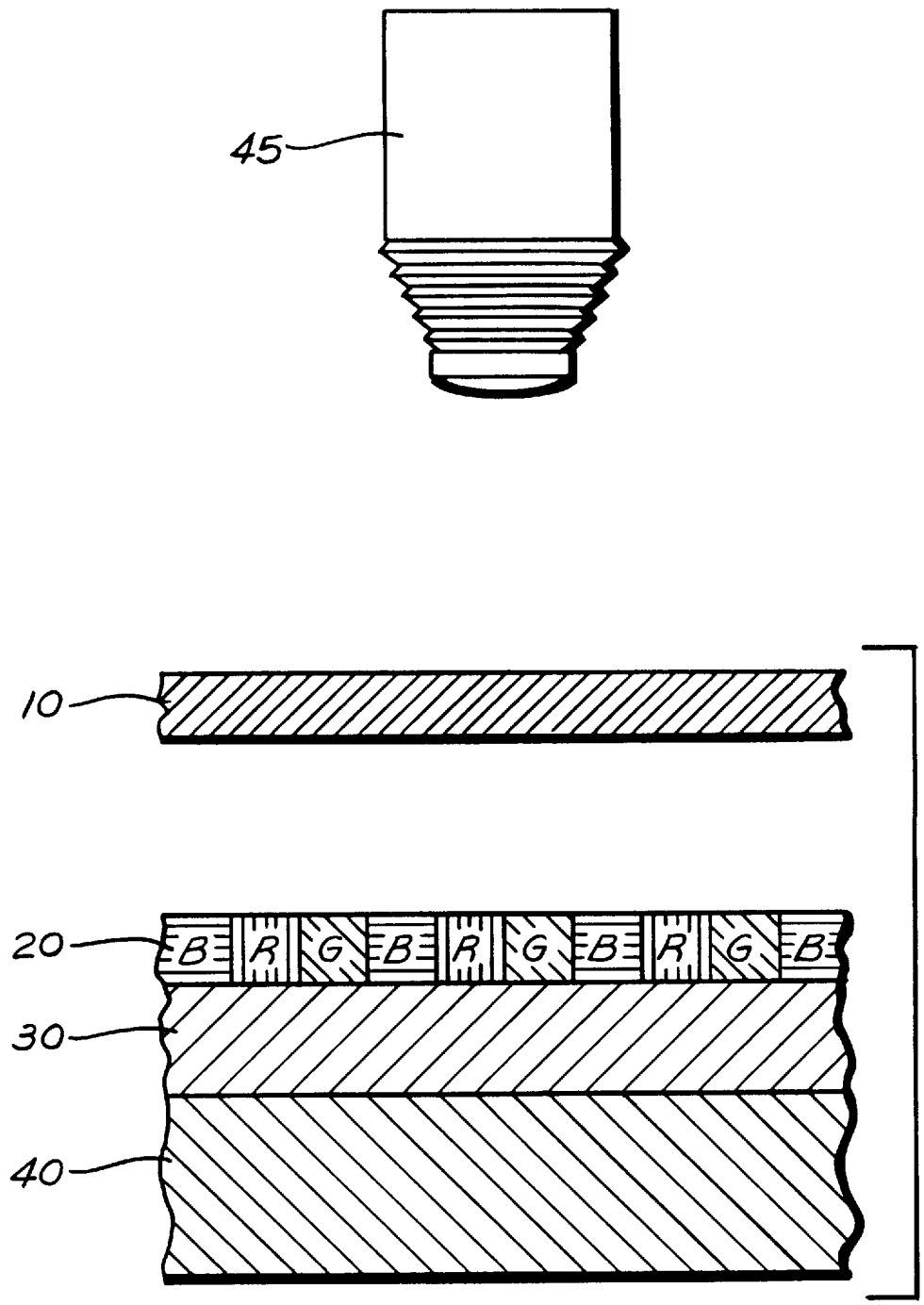
FIG. 7 shows a projection device and a multicolor screen with a reflective base.

In another preferred embodiment (FIG. 6), antiquation may be affected by using an electronic processor 70. With this method, an image of a given subject 65 and an image of the multicolor screen 20 are translated into digital or analog signals and then combined to form an antiquated image sample product 80. These signals, or the images from which they are taken, may also be modified to add diffusion or pastel effects 75.

In the present invention a transparent multicolor screen 20 is formed. Such a screen comprises a plurality of light-filtering colored elements with each element of a different color. Thus a conventional three color additive screen contains an array of alternating red, green, and blue filter elements. This array is divided in such a way that the width of the color elements is generally greater than the width of the spaces dividing the color elements. The areas dividing the color elements are generally non-reflective in nature. However, colored, mirrored, or other reflective areas are also contemplated. These color elements and their dividers are formed to such a scale that the discrete colored elements are not readily visible to the unaided eye.

A multicolor screen 20 may be formed in many ways. First, a screen may be prepared by totally mechanical means. For example, one may print or rule a dyeable substrate, such as a greasy ink formulation in accordance with the desired filter pattern, and subject the substrate to suitable coloration in areas which do not posses the repellent ink mask. Repeating this procedure a sufficient number of times in accordance with the desired geometrical pattern of the filter elements provides the desired multiplicity of diversely colored filter elements.

Second, a multicolor screen 20 may be formed by directly printing a carrier substrate with the desired dye formulations in accordance with the desired predetermined filter pattern. Repeating this printing procedure a sufficient number of times provide the multiplicity of colored filter elements desired.

In another preferred method, a multicolor screen pattern is drawn or printed on an enlarged scale and then photo-reduced to the desired scale using negative or reversal film with a transparent base.

In yet another methods, a multicolor screen may be formed electronically as a function of digital or analog processing Various colors and numbers of colors may be used in the present invention, but the preferred system is a tri-color arrangement of the three primary colors: red, green, and blue (or variations thereof, such as orange/red, yellow/green, and violet). One preferred color combination is: 563U, 199U, and 2665U according to the Pantone/Letraset color guide. The commercialmarket contains many color labeling systems representing thousands of colors and naunce of color. Accordingly the above Pantone colors should be construed to prelude their aproximations or equivalents using Pantone or other color labeling systems. Color elements of the complimentary colors: yellow, cyan, and magenta (or variations thereof) are also contemplated. Furthermore, the notion of any or all of the above mentioned colors being translated into their corresponding negative colors either as a function of exposure, printing, drawing, digital imaging, or other means is contemplated as well.

The above descriptions of forming multicolor screens are believed to be adequate to suggest other means of screen formulation too numerous to discuss individually.

After formulation, the transparent multicolor screen is then placed so that the plane formed by its width occupies the focal plane of a beam of projected light. This light expresses a negative or reversal photographic image and may originate from any of a number of light-projecting units such as slide transparency or opaque projectors, enlargers, copiers or other units. The multicolor screen 20 is then arranged so that projected light entering the screen is reduced exponentially. This arrangement is affected in FIG. 2 by placing the multicolor screen 20 against a usually white reflective surface 40. Mirrored, colored, or other reflective surfaces are also contemplated.

When a recorded image such as a slide transparency is projected onto the screen, photons striking the multicolor screen 20 are reduced in number according to color as they pass through the multicolor screen 20. After this stage, the photons bounce off the reflective base 40 and are then reduced again as they pass back through the multicolor screen 20. During this process the projected image is altered significantly so that the resulting image is darker in tone, less acute, altered in hue, and cast with a generally amber or sepia tint.

The antiquation effect described above is also variously enhanced by placing a neutral colored diffusion filter 10 across the path of projected light. According to effects, this filter may be any of a variety of styles generically labeled as diffusion, halation, or pastel. Pastel filters are generally considered to be the most effective.

As the above visual characteristics are all produced simultaneously and collectively affect antiquation, a relationship of synergy exists between the elements of my multicolor screen and the production of an antiquated image.

Because antiquation is affected without the need of a chemical reaction, unexpected advantages are reaped from the present invention. In one preferred embodiment, a reflective or transmission multicolor screen 20 (FIG. 2) may be constructed to a portable size, such as 200 mm×260 mm. The photographer may then use the screen 20 to affect antiquation selectively and on location by making two exposures on the same frame. One of the exposures must be of the multicolor screen 20 and the other exposure should be of the subject using known multi-exposure techniques. Thus the photographer may affect antiquation on specific frames of a roll of film without the need to change film as would be require with the prior art.

In another preferred embodiment (FIG. 3 and 4), two multicolor screens 20 are placed in register so the necessary filtration is affected by passing the projected light through both screens, The antiquated image is rendered visible with the use of a translucent filter 50. This filter should be neutral in color although colored filters are also contemplated. Then the filter is placed in front or in back of the registered screens (FIG. 4) or between the screens (FIG. 3). The above screen elements are placed so that the plane formed by the width of the combined screen elements occupies the focal plane of a beam of projected light, with this light expressing a negative or reversal photographic image. The image is then projected onto and through the filter elements. The translated antiqued image formed is viewable from the opposite side. This translucent version of my multicolor screen is useful for translating a variety of images in succession. Because this method is incorporated after the initial image has been recorded, the photographer is free to use any film regardless of format, film speed, or negative or reversal stock category to record the image. In comparison, using the prior art would limit film selection to only those films which would incorporate multicolor screens into their supports or emulsions.

One problem encountered with the present invention is the imbrication of overpowering of one color over the remaining colors in the final image. This imbrication generally occours with red as the dominant color. The degree of imbrication will vary according to the relative size of the colored elements. The smaller the elements the greater the imbrication. Imbrication is especially prominent using the transmission mode of FIGS. 3–5. Some imbrication is inherent in the antiquation process. However, severe imbrication will create strong color casts inconsistent with the above Pantone colors. Consequently, recorded images may bear a pronounced orangish or pinkish cast in the film or in the final print. Different methods may be used to supress imbrication. One prefered method is the use of a color correcting filter formed by the following process: a color graph of the above Pantone colors is projected through the multicolor screen, then recorded. After development the resulting print is then color corrected until its colors roughly coincide with the original Pantone colors. The color correction is noted. A recording is then made of a white surface illuminated by light from the projection unit. The film is developed and a print is made using the above color correction. The resulting print will be tinted, both in color and degree to the complimentary of the color imballance. A color positive transparency of the print will produce a filter which, when placed between the light source and the recording device will address the color imballance.

Other methods may be used to reduce imbrication. For example: colored elements may be varied according to size, number and color frenquency. Denser versions of the offending color may be substituted so as to reduce its influence. However the above color correction process, or a variation of it is the prefered method.

Because of the problem of imbrication, the above Pantone colors should not be construed as the only colors suitable to the present invention.

Figure 8A:
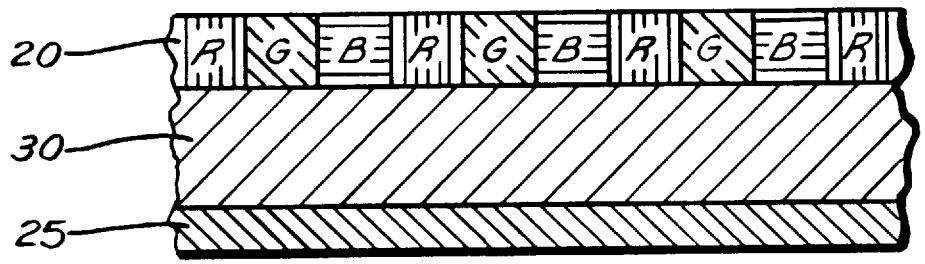
FIGS. 8A and 8B show two overlay applications of the multicolor screen.

In another prefered embodiment (FIG. 8A) an antiquated image may be formed by placing the multicolor screen 20 over the media to be exposed 25 and exposing the image through it. Generally such media would be photographic paper using an enlarger as a projection device, but other photographic media and projection devices are contemplated as well.

Figure 8B:
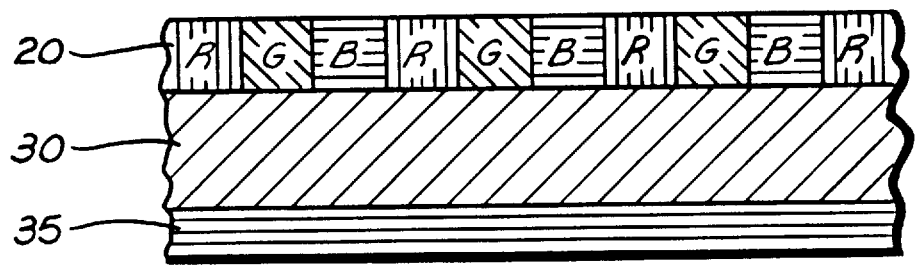

In another prefered embodiment (FIG. 8B) an antiquated image may be formed by placing the multicolor screen 20 over exposed and developed media 35 such as a finished print. While this embodiment expends a multicolor screen for each image formed it nonetheless has several advantages over the prior art. Among these: it allows the artist to test the effects of the screen on a given media before adhering it to the media. The multicolor screen may be printed in different grades of density and embelished with different effects such as halation or burned in edges. These effects may be integrated into the individual colored elements or added separately in layers. Thus the artist is permitted greater flexibility over the final print.

In another preferred embodiment (FIG. 6), antiquation may be affected by using an electronic processor 70. In using this method, an image of a multicolor screen 20 and the image of a given subject 65 are translated into an electromagnetic signal and combined to form a signal to produce an antiquated image sample product 80. This step may be accomplished using either digital or analog means, and the signal produced may be modified to add diffusion or pastel visual effects 75.

SUMMARY, RAMIFICATIONS AND SCOPE

Accordingly, the reader will see that the multicolor screen of the present invention may be used to produce antiquated photographic images quickly and inexpensively, without the chemical reactions required in the prior art.

In addition to the above embodiments and advantages, other benefits may be realized, For example, by combining a variable size ratio of filter elements to image size and by selectively exposing images from any film media, the present invention is useful for motion picture applications.

The present invention also reduces film waste through selective exposure and the reuse of a single multicolor screen for an indefinite number of translations.

The above examples and descriptions provide only some of the presently preferred embodiments of the invention. The above descriptions should not be construed as limiting or defining the boundaries of invention. For example, the two multicolor screens may be placed out of register or the elements of the multicolor screen may be shaped in hexagons or squares, etc.

Accordingly, the scope of the invention should be determined not by the embodiments illustrated but rather by the appended claims and their legal equivalents.

What is claimed is:

1. A process for altering a visually recorded image, consisting of:
   providing a visually recorded image;
   providing a transparent multicolor screen;
   projecting the visually recorded image on the transparent multicolor screen so that the projected image has at least three of the following characteristics:
   darkened tonality, loss of acuteness, muting of hue and a general sepia color cast,
relative to the visually recorded image.

2. The process of claim 1 wherein a mosaic arrangement of colored elements of the multicolor screen is employed such that the elements violate a strictly geometric order with regards to shape, size or arrangement.

3. A process for forming an altered image, consisting of:
   providing a first image to be recorded;
   providing a multicolor screen;
   providing a recording medium;
   exposing the first image to be recorded and the multicolor screen in the same location on the recording medium to produce an altered image which has at least three of the following characteristics:
   darkened tonality, loss of acuteness, muting of hue and a general sepia color cast,
relative to the first image to be recorded.

4. The process of claim 3 wherein a mosaic arrangement of colored elements of the multicolor screen is employed such that the elements violate a strictly geometric order with regards to shape, size or arrangement.

5. A process for altering a visually recorded image, consisting of:

providing a visually recorded image;

providing a transparent multicolor screen;

overlaying the visually recorded image with the transparent multicolor screen, thus reducing the image so that the reduced image has at least three of the following characteristics:

darkened tonality, loss of acuteness, muting of hue and a general sepia color cast, relative to the visually recorded image.

* * * * *